United States Patent
Kim et al.

(10) Patent No.: US 7,505,743 B2
(45) Date of Patent: *Mar. 17, 2009

(54) DUAL BAND TRANSMITTER HAVING FILTERING COUPLER

(75) Inventors: Young Hoon Kim, Seoul (KR); Ki Joong Kim, Cheonrabuk-do (KR); Dae Hun Hur, Suwon (KR); Woo Jin Byun, Suwon (KR)

(73) Assignee: Samsung Electro-Mechanics Co., Ltd., Suwon, Kyungki-Do (KR)

( * ) Notice: Subject to any disclaimer, the term of this patent is extended or adjusted under 35 U.S.C. 154(b) by 852 days.

This patent is subject to a terminal disclaimer.

(21) Appl. No.: 10/849,230

(22) Filed: May 20, 2004

(65) Prior Publication Data

US 2005/0197153 A1    Sep. 8, 2005

(30) Foreign Application Priority Data

Mar. 4, 2004    (KR) ............... 10-2004-0014668

(51) Int. Cl.
*H04B 1/02* (2006.01)
(52) U.S. Cl. ............... 455/127.4; 455/115.3; 455/553.1
(58) Field of Classification Search ................. 455/126, 455/125, 121–124, 91, 103, 115.1–115.3, 455/127.1–127.3, 553.1
See application file for complete search history.

(56) References Cited

U.S. PATENT DOCUMENTS 6,125,271 A    9/2000    Rowland, Jr.

FOREIGN PATENT DOCUMENTS

| EP | 0 859 464 | 8/1998 |
|---|---|---|
| TW | 439352 | 6/2001 |
| WO | 01/67596 | 9/2001 |

OTHER PUBLICATIONS

Taiwan Intellectual Property Office, Office Action along with English explanation of the Office Action.

*Primary Examiner*—Philip J Sobutka
(74) *Attorney, Agent, or Firm*—Lowe Hauptman Ham & Berner

(57) ABSTRACT

The invention provides a dual band transmitter available for a mobile communication terminal such as mobile phone, in which a first RF amplifier 111 amplifies the power of a high band signal BS1 at a first amplification factor that is determined according to a first bias voltage. A second RF amplifier 121 amplifies the power of a low band signal BS2 at a second amplification factor determined according to a second bias voltage. A first coupling capacitor C11 couples an output signal from the first RF amplifier 111. A second coupling capacitor C21 couples an output signal from the second RF amplifier 121. A filtering coupler 140 has a high pass filter FT1 for a first coupled signal from the first coupling capacitor C11 and a low pass filter FT2 for a second coupled signal from the second coupling capacitor C21. A power amplifier controller 150 compares the magnitudes of filtered signals from the filtering coupler 140 with preset reference values to obtain difference values, and adjusts the bias voltages of the first and second RF amplifiers 111 and 121 based upon the difference values to control the first and second amplification factors.

2 Claims, 6 Drawing Sheets

US 7,505,743 B2

DUAL BAND TRANSMITTER HAVING FILTERING COUPLER

BACKGROUND OF THE INVENTION

1. Field of the Invention

The present invention relates to a dual band transmitter available for a mobile communication terminal such as mobile phone, and more particularly, to a dual band transmitter in which a filtering coupler for detecting RF transmission signals is constituted of filters in order to improve isolation characteristics between low and high bands in a dual band mode and also achieve advantageous effects of size reduction and high integration.

2. Description of the Related Art

In general, a power amplifier is used in a transmission terminal of a mobile communication terminal such as a mobile phone in order to amplify the power of a transmission signal to be transmitted via an antenna. In this case, the power amplifier is required to amplify the transmission signal at a suitable power. According to a scheme for adjusting the output power of the power amplifier, there is used a closed loop technique by which an output signal is sampled by a directional coupler mounted on an output terminal of the power amplifier, converted into a DC voltage with a Schottky diode, and then compared with a reference voltage by using a comparator. An open loop technique is also used to adjust the power by sensing voltage or current.

The closed loop technique, as a conventional scheme, has an advantage in that power can be precisely controlled but drawbacks in that a circuit is complicated and an amplifier has poor efficiency owing to loss by a coupler. Although the open loop method is widely used with an advantage in that a circuit has a simple structure, there is a drawback in that power is not precisely controlled.

Recently, circuits are simplified as components used in the closed loop technique are provided from ICs. Also, the upgrade of control chips remarkably lowers the coupling factor of directional couplers thereby reducing the loss by directional couplers to a significant level. In particular, the closed loop technique by which power can be precisely controlled is applied to the GSM communication in which a ramping profile is especially important.

A dual band transmitter based upon the closed loop technique will be described as follows.

As shown in FIG. 1, the conventional dual band transmitter includes a first power amplifier 11 for amplifying the power of a first band signal BS1, a first coupler 12 for sampling an output signal from the first power amplifier 11, a first power amplifier controller 13 for comparing the magnitude of the first sampled signal with a first preset reference value to control the amplification factor of the first power amplifier 11, a first low-pass filter 14 for allowing low band pass to the first sampled signal from the first coupler 12, a second power amplifier 21 for amplifying the power of a second band signal BS2, a second coupler 22 for sampling an output signal from the second power amplifier 21, a second power amplifier controller 23 for comparing the magnitude of the second sampled signal with a second preset reference value to control the amplification factor of the second power amplifier 21, a second low-pass filter 24 for allowing low band pass to the second sampled signal from the second coupler 22 and a switch 25 for selectively outputting an output signal from the first low-pass filter 14 or the second low-pass filter 24 to a transmitting antenna ANT.

As described above, the conventional dual band transmitter has two paths of low and high bands, but only one of the paths is selectively used. In a terminal adopting this type of dual band transmitter, when RF transmission is executed, the directional couplers generate coupled signals from those signals amplified by the power amplifiers. Then, the coupled signals are converted into specific levels of voltages by detection diodes, and compared with reference values to adjust the bias voltages of the power amplifiers to desired values.

FIGS. 2A and 2B are graphs illustrating characteristics of a directional coupler as shown in FIG. 1.

The directional coupler as shown in FIG. 1 causes signal attenuation of about −20 dB in a low band of about 800 MHz as shown in FIG. 2A, but about −15 dB in a high band of about 1900 MHz.

Such a conventional dual band transmitter necessarily incorporates two couplers and two power amplifier controllers in order to control powers for dual band signals, that is, signals in a low band of about 800 MHz and in a high band of about 1900 MHz, in which each power amplifier controller is constituted of a complex circuit including a diode, a comparator and so on. Thus, as drawbacks, the dual band transmitter can be hardly miniaturized or integrated.

For example, when direction couplers are designed to have the coupling values of 19 dB at about 900 MHz and 14 dB at about 1.9 GHz, a PCB has following line magnitudes such as line width w and line length L: In 900 MHz, w is 0.38 mm, and L is 20 mm, and in 1900 MHz, w is 0.38 mm and L is 10 mm.

In this case, because the directional couplers have characteristics sensitive to the length of dielectric material, the line length is especially large. Also, two directional couplers of this size are mounted together with elements necessary for bands on a PCB, the transmitter can be hardly reduced with size.

Recently, the Integrated Passive Device (IPD) process is widely used to integrate components. However, because the IPD process remarkably raises cost in proportion with the size of components, couplers of this type increases size and thus unfortunately lessens the advantage of the IPD process.

In the meantime, in order to decrease the complexity of a dual band transmitter as shown in FIG. 1, there was proposed a dual band transmitter as shown in FIG. 3.

FIG. 3 is a conceptual view illustrating another conventional dual band transmitter.

As shown in FIG. 3, the conventional dual band transmitter includes a first RF amplifier 31 for amplifying the power of a first band signal BS1, a second RF amplifier 32 for amplifying the power of a second band signal BS2, a single coupler 33 for sampling a first output signal from the first RF amplifier 31 and a second output signal from the second RF amplifier 32, a matching circuit 34 for matching a signal from the single coupler 33 to the rear stage, and a power amplifier controller 35 for comparing the magnitudes of sampled signals by the single coupler 33 with preset reference values to control the amplification factor of the first amplifier 31 or the amplification factor of the second amplifier 35 via the matching circuit 34.

Further, the single coupler 33 includes a first band signal line SL1, a second band signal line SL2 and a coupling line SL3 laid in the vicinity of the two band signal lines SL1 and SL2. The coupling line SL3 is shared by the two bands, a grounded port of the coupled line has a resistance RT of 50Ω. In this coupler, a coupling factor is determined by the gap between the coupling line and the signal lines and the length in vicinity, typically, λ/4.

The single coupler 33 of the dual band transmitter uses the coupling line, which is coupled into one line, so that signals coupled in the two bands are outputted via one port. As a result, the coupler itself is reduced with size, and has only a single detecting diode and a single comparator. Thus, the circuit of the coupler is more simplified than that of the coupler shown in FIG. 1.

FIG. 4A to 4C are graphs illustrating characteristics of the directional coupler shown in FIG. 3.

As shown in FIG. 4, the single coupler shown in FIG. 3 causes signal attenuation of about −20 dB in a low band of about 800 MHz as shown in FIG. 4A but about −15 dB in a high band of about 1900 MHz as shown in FIG. 4B.

However, as shown in FIG. 4C, it can be understood that the single coupler has poor isolation characteristics between the low band of 800 MHz and the high band of 1900 MHz.

Further, because the coupling line is shared, a low band path is laid in vicinity of a high band path thereby to degrade the isolation characteristics between the two paths.

SUMMARY OF THE INVENTION

The present invention has been made to solve the foregoing problems of the prior art and it is therefore an object of the present invention to provide a dual band transmitter in which a filtering coupler for detecting RF transmission signals is constituted of filters in order to improve isolation characteristics between low and high bands in a dual band mode and also achieve advantageous effects of size reduction and high integration.

According to an aspect of the invention for realizing the object, there is provided a dual band transmitter in use for a dual band mobile communication terminal comprising:

a first RF amplifier for amplifying the power of a high or first band signal at a first amplification factor that is determined according to a first bias voltage;

a second RF amplifier for amplifying the power of a low or second band signal at a second amplification factor that is determined according to a second bias voltage;

a first coupling capacitor for coupling an output signal from the first RF amplifier;

a second coupling capacitor for coupling an output signal from the second RF amplifier;

a filtering coupler having a first filter for affording high band pass to a first coupled signal from the first coupling capacitor and a second filter for affording low band pass to a second coupled signal from the second coupling capacitor; and a power amplifier controller for comparing the magnitude of a filtered signal from the filtering coupler with preset reference values to obtain difference values and adjusting the bias voltages of the first and second RF amplifiers based upon the difference values to control the first and second amplification factors.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Figure 1:
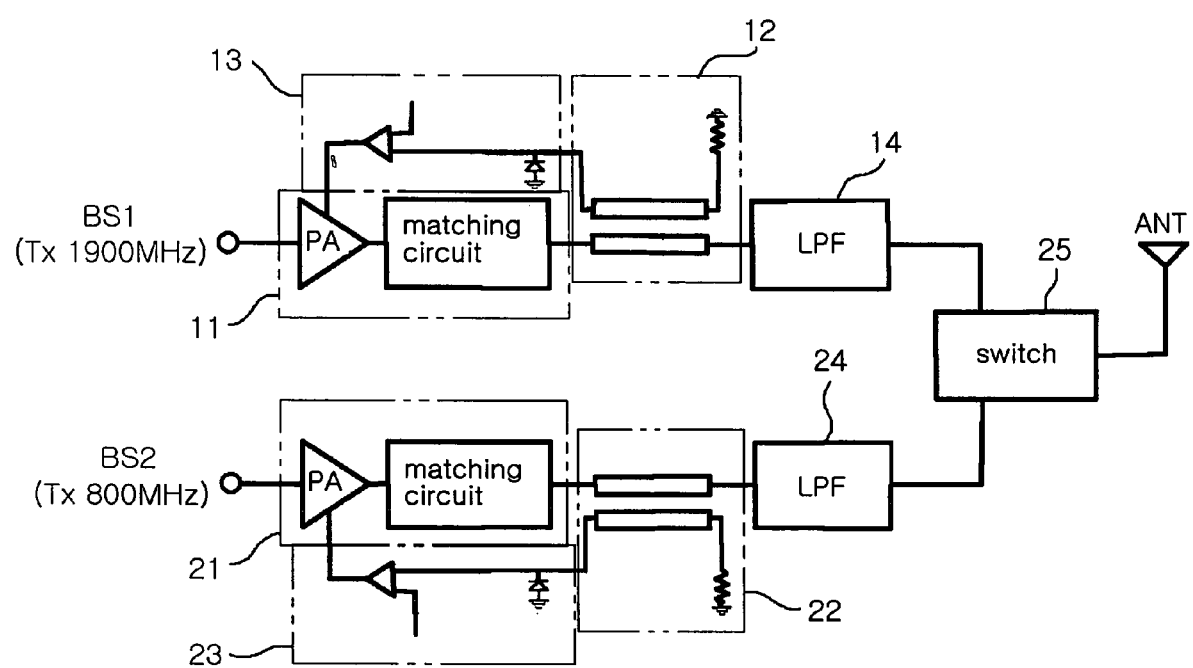
FIG. 1 is a conceptual view illustrating a conventional dual band transmitter.
Figure 2A:
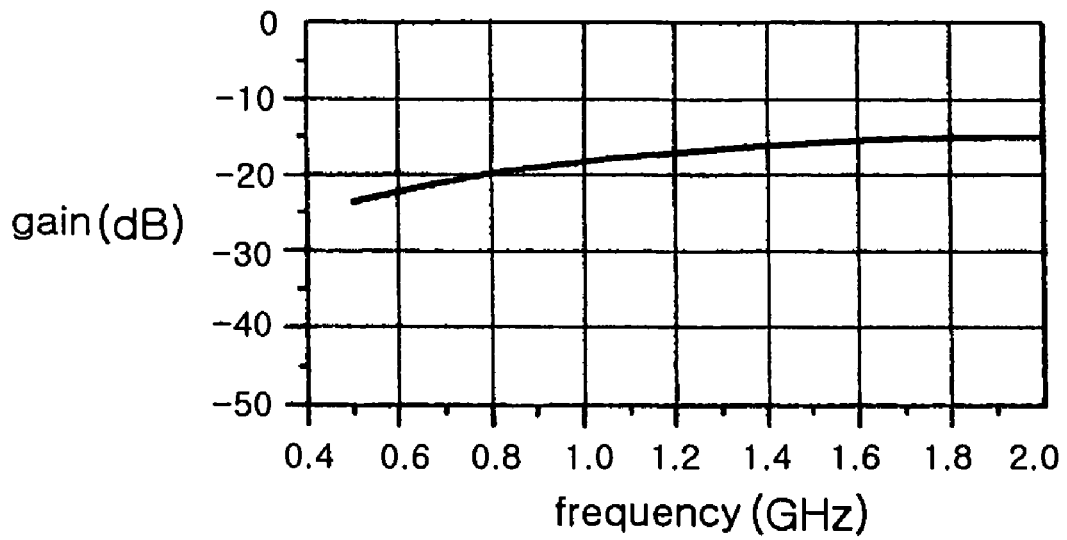
FIGS. 2A and 2B are graphs illustrating characteristics of a directional coupler shown in FIG. 1.
Figure 2B:
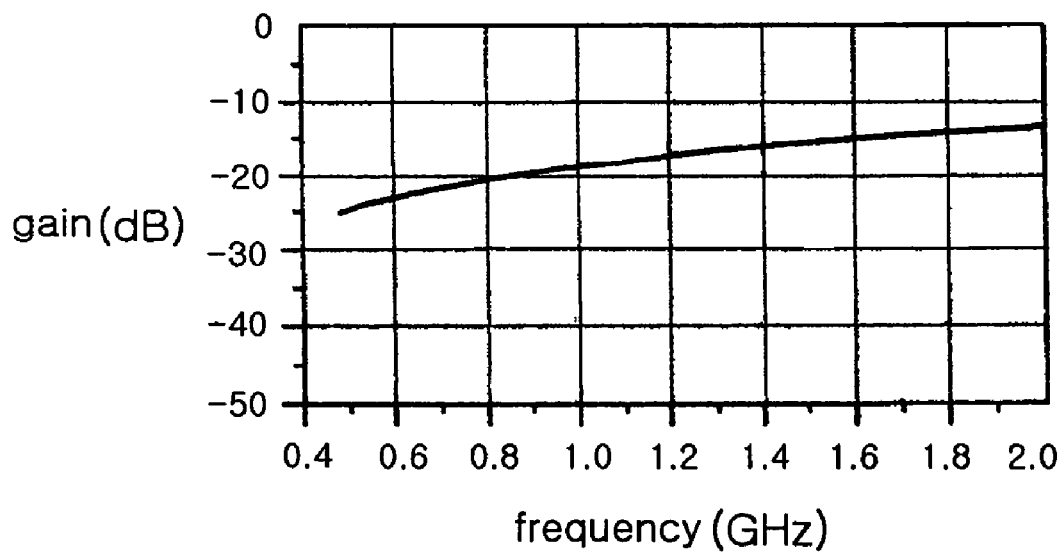
Figure 3:
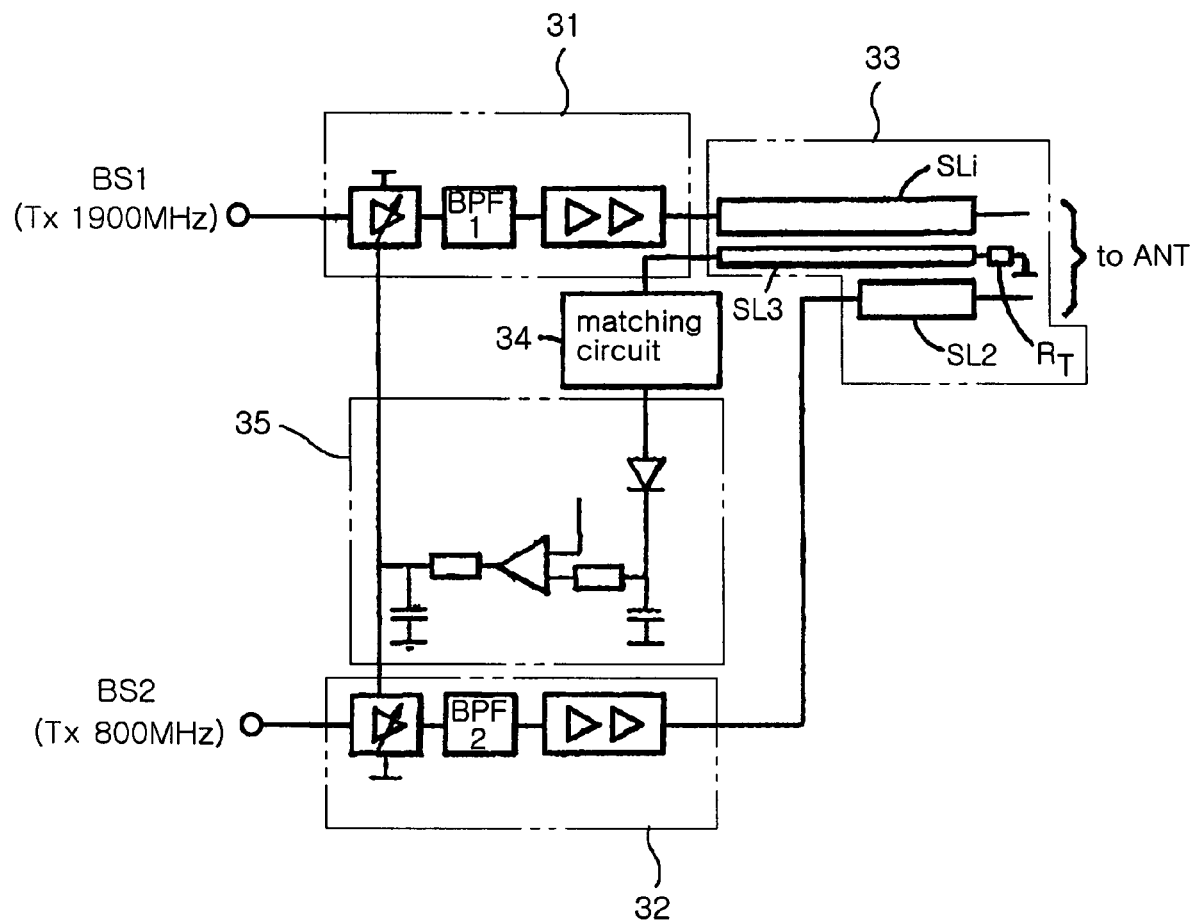
FIG. 3 is a conceptual view illustrating another conventional dual band transmitter.
Figure 4A:
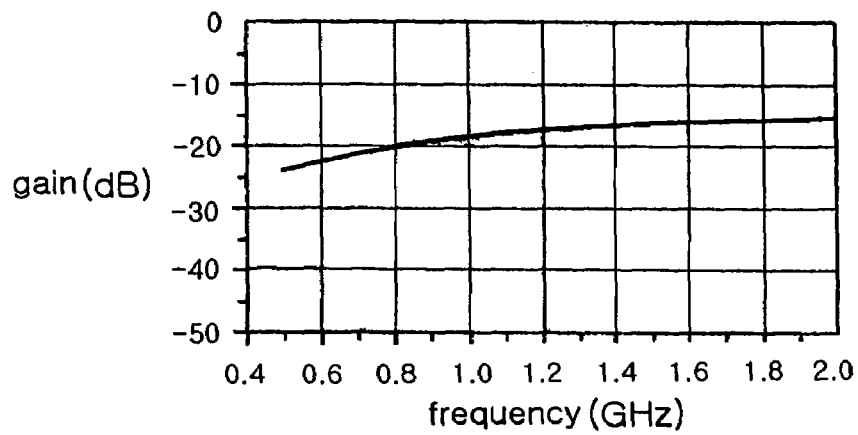
FIG. 4A to 4C are graphs illustrating characteristics of a directional coupler shown in FIG. 3.
Figure 4B:
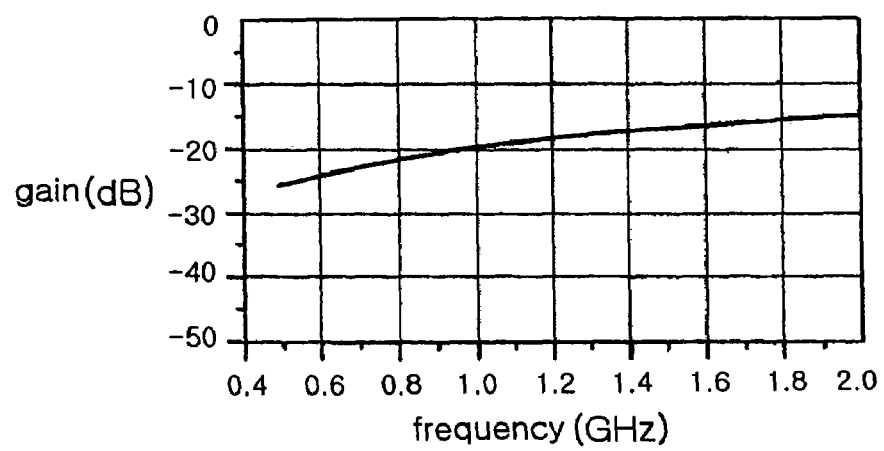
Figure 4C:
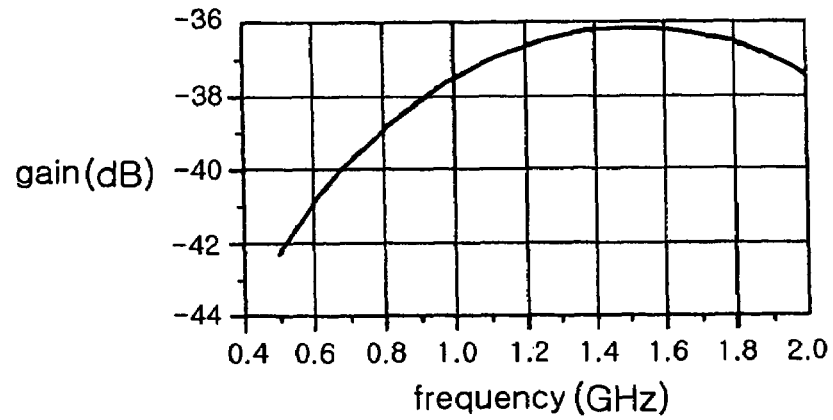

A preferred embodiment of the present invention will now be described in detail with reference to the accompanying drawings.

Reference now should be made to the drawings, in which the same reference numerals are used throughout the different drawings to designate the same or similar components.

Figure 5:
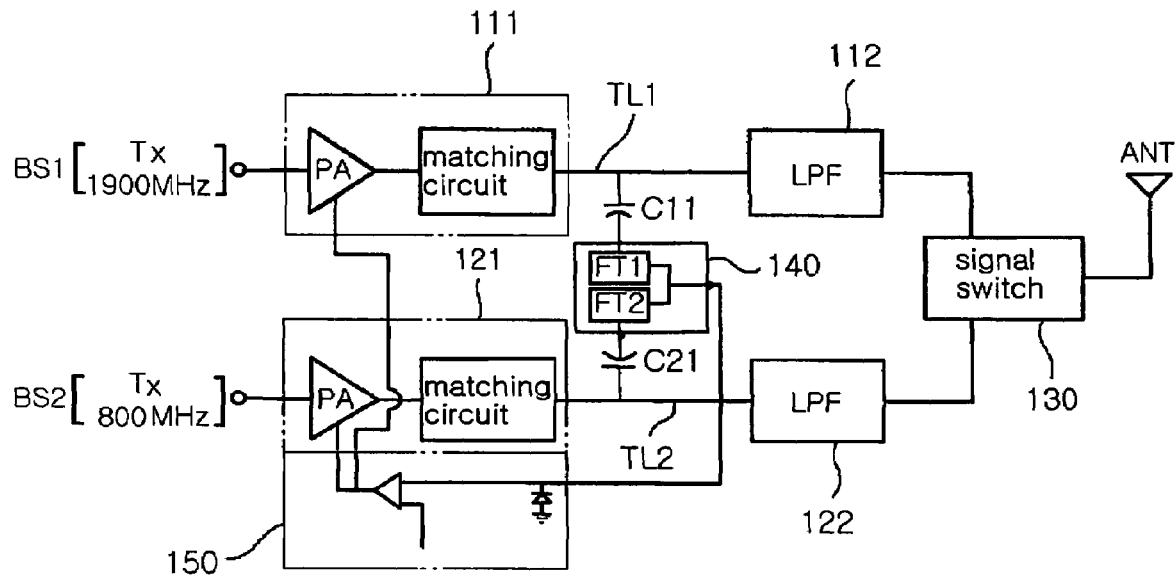
FIG. 5 is a conceptual view illustrating a dual band transmitter incorporating a coupler according to the invention.

FIG. 5 is a conceptual view illustrating a dual band transmitter incorporating a coupler according to the invention.

Referring to FIG. 5, the dual band transmitter of the invention is applied to a dual band communication terminal. The dual band transmitter of the invention includes a first RF amplifier 111 for amplifying the power of a high or first band signal BS1 at a first amplification factor that is determined according to a first bias voltage, a second RF amplifier 121 for amplifying the power of a low or second band signal BS2 at a second amplification factor that is determined according to a second bias voltage, a first coupling capacitor C11 for coupling an output signal from the first RF amplifier 111, a second coupling capacitor C21 for coupling an output signal from the second RF amplifier 121, a filtering coupler 140 for filtering a first coupled signal from the first coupling capacitor C11 and for filtering a second coupled signal from the second coupling capacitor C21, and a power amplifier controller 150 for comparing the magnitudes of filtered signals from the filtering coupler 140 with preset reference values to obtain difference values and adjusting the bias voltages of the first and second RF amplifiers 111 and 121 based upon the difference values to control the first and second amplification factors.

In the dual band transmitter of the invention, each of the first and second RF amplifiers 111 and 121 may include a matching circuit for impedance matching with a next stage, and the power amplifier controller 150 may include devices such as a diode for converting the signals from the filtering coupler 140 into a stable voltage.

The filtering coupler 140 includes a first filter FT1 and a second filter FT2, in which the first filter FT1 affords high band pass to the first coupled signal from the first RF amplifier 111 that is coupled by the first coupling capacitor C11, and the second filter FT2 affords low band pass to the second coupled signal from the second RF amplifier 121 that is coupled by the second coupling capacitor C21.

Figure 6:
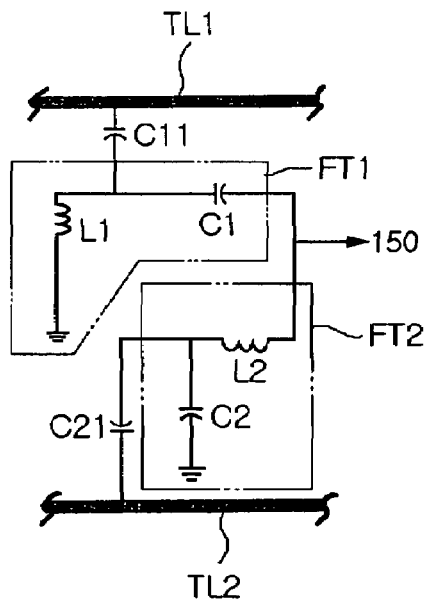
FIG. 6 is a circuit diagram illustrating a coupler having filters according to the invention.

FIG. 6 is a circuit diagram illustrating a coupler having filters according to the invention.

Referring to FIG. 6, the first filter FT1 is of a high pass filter having a capacitor and an inductor arranged between the first coupling capacitor C11 and a filter output terminal.

The filter is of a low pass filter having a capacitor and an inductor arranged between the second coupling capacitor C21 and a filter output terminal.

Figure 7A:
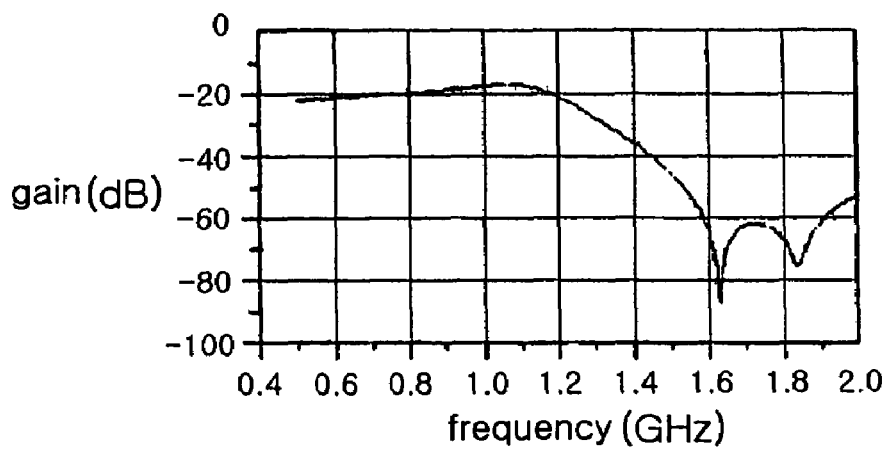
FIGS. 7A to 7C are graphs illustrating characteristics of the coupler shown in FIG. 6.
Figure 7B:
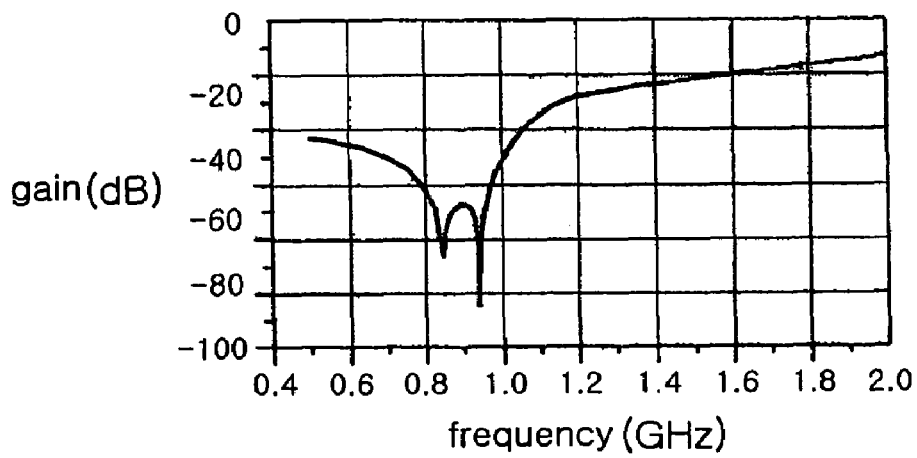
Figure 7C:
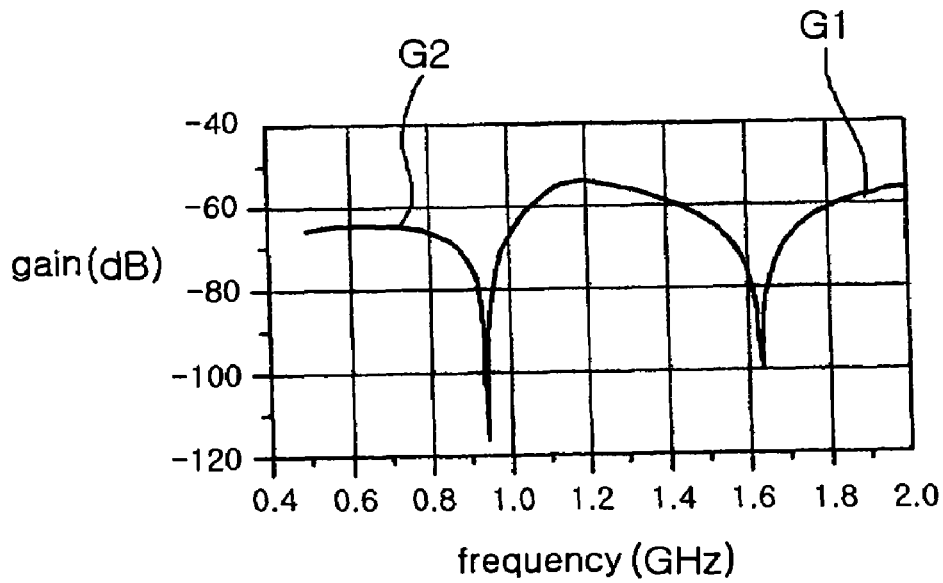

FIGS. 7A to 7C are graphs illustrating characteristics of the coupler shown in FIG. 6.

FIG. 7A shows signal coupling characteristics of the filtering coupler in FIG. 5 in a low band of about 800 MHz, FIG. 7B shows signal coupling characteristics of the filtering coupler in FIG. 5 in a low band of about 1900 MHz, and FIG. 7C shows isolation characteristics between the two bands, that is, the low band of about 800 MHz and the high band of 1900 MHz.

Herein, the reference numerals 112 and 122 designate first and second low pass filters, respectively, the reference numeral 130 designates a signal switch, and the reference numerals TL1 and TL2 designate output transmission lines of the first and second RF amplifiers 111 and 121, respectively.

Now the operation and effects of the invention will be described in detail with reference to the accompanying drawings.

The invention provides the dual band transmitter applicable to a mobile communication terminal such as a mobile phone, in which a coupler for detecting RF transmission signals is constituted of filters, in order to improve isolation characteristics, as will be described in conjunction with FIGS. 5 to 7.

Referring to FIG. 5, the first RF amplifier 111 of the invention amplifies the power of a first band signal BS1 in a high frequency band at a first amplification ratio determined by a first bias voltage and outputs a first amplified signal. The second RF amplifier 121 amplifies the power of a second signal BS2 in a low frequency band at a second amplification ratio determined by a second bias voltage and outputs a second amplified signal. Herein the first band signal may have a frequency of about 1800 MHz according to GSM1800 (DCS1800) or about 1900 MHz according to GSM1900 (PCS1900). The second band signal BS2 may have a frequency of about 900 MHz according to GSM900 (GSM).

Then, an output signal from the first RF amplifier 111 is coupled by the first coupling capacitor C11, and a coupled signal is sent to the filtering coupler 140. Likewise, an output signal from the second RF amplifier 121 is coupled by the second coupling capacitor C21, and coupled signal is sent to the filtering coupler 140.

In this case, the filtering coupler 140 filters the output signal from the first RF amplifier 111 that is coupled by the first coupling capacitor C11 or the output signal from the second RF amplifier 121 that is coupled by the second coupling capacitor C21, as will be described in detail in conjunction with FIGS. 6 to 7C.

Referring to FIG. 6, the first filter FT1 of the filtering coupler affords high band pass to the signal from the first RF amplifier 111 that is coupled by the first coupling capacitor C11, and the second filter FT2 of the filtering coupler affords low band pass to the signal from the second RF amplifier 121 that is coupled by the second coupling capacitor C21.

Herein the first filter FT1 allows the passage of frequencies exceeding a first cutoff frequency determined by a capacitor C1 and an inductor L1, whereas the second filter FT2 allows the passage of frequencies up to a second cutoff frequency determined by a capacitor C2 and an inductor L2.

With the first and second filters FT1 and FT2 of the filtering coupler 140, the first band signal BS1 and the second band signal BS2 are sent to the power amplifier controller 150, respectively, without signal interference, as will be described in conjunction with FIGS. 7A to 7C.

FIGS. 7A to 7C are graphs illustrating characteristics of the coupler shown in FIG. 6.

The single coupler shown in FIG. 5 shows signal attenuation of about −20 dB in a low band of about 800 MHz as shown in FIG. 7A, and signal attenuation of about −15 dB in a high band of about 1900 MHz as shown in FIG. 7B.

As shown in FIG. 7C, it can be understood that the single coupler has excellent isolation characteristics between the low band of 800 MHz and the high band of 1900 MHz.

Next the power amplifier controller 150 compares the magnitudes of signals from the filtering coupler 140 with preset reference values to obtain difference values, and adjusts the bias voltages of the first and second RF amplifier 111 and 121 based upon the difference values to control their amplification ratios.

As set forth above, the transmitter of the invention adopts a novel filtering coupler, replacing the conventional directional coupler, in which the coupling factor of the filtering coupler is determined by coupling capacitors connected to signal lines. For example, the invention can ensure sufficient isolation between two band signals by coupling filters connected between a DCS line for a first band signal and a GSM line for a second band signal.

As set forth above, the invention provides a dual band transmitter available for a mobile communication terminal such as mobile phone, in which a filtering coupler for detecting RF transmission signals is constituted of filters in order to improve isolation characteristics between low and high bands in a dual band mode and also achieve advantageous effects of size reduction and high integration.

While the present invention has been described with reference to the particular illustrative embodiments and the accompanying drawings, it is not to be limited thereto but will be defined by the appended claims. It is to be appreciated that those skilled in the art can substitute, change or modify the embodiments into various forms without departing from the scope and spirit of the present invention.

What is claimed is:

1. A dual band transmitter in use for a dual band mobile communication terminal comprising:

a first RF amplifier for amplifying the power of a high or first band signal at a first amplification factor that is determined according to a first bias voltage;

a second RF amplifier for amplifying the power of a low or second band signal at a second amplification factor that is determined according to a second bias voltage;

a first coupling capacitor for coupling an output signal from the first RF amplifier;

a second coupling capacitor for coupling an output signal from the second RF amplifier;

a filtering coupler having a first filter for affording high band pass to a first coupled signal from the first coupling capacitor and a second filter for affording low band pass to a second coupled signal from the second coupling capacitor; and a power amplifier controller for comparing the magnitude of a filtered signal from the filtering coupler with preset reference values to obtain difference values and adjusting the bias voltages of the first and second RF amplifiers based upon the difference values to control the first and second amplification factors.

2. The dual band transmitter according to claim 1, wherein the first filter FT1 comprises a high pass filter having a capacitor and an inductor arranged between the first coupling capacitor C11 and a filter output terminal, and wherein the filter comprises a low pass filter having a capacitor and an inductor arranged between the second coupling capacitor C21 and a filter output terminal.

* * * * *